(12) United States Patent
Shikama

(10) Patent No.: US 6,288,689 B1
(45) Date of Patent: Sep. 11, 2001

(54) EYEPIECE IMAGE DISPLAY APPARATUS

(75) Inventor: Shinsuke Shikama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/073,868

(22) Filed: May 7, 1998

(30) Foreign Application Priority Data

May 26, 1997 (JP) ...................................................... 9-134992

(51) Int. Cl.$^7$ ...................................................... G09G 5/00
(52) U.S. Cl. ...................................................... 345/7; 345/8
(58) Field of Search .................................. 345/8, 9, 117; 359/630, 641, 642–800, 618, 629; 348/54, 59, 36, 39, 746, 147, 53

(56) References Cited

U.S. PATENT DOCUMENTS

| | | | |
|---|---|---|---|
| 4,654,876 | * 3/1987 | Atkins | 348/147 |
| 5,329,310 | * 7/1994 | Liljegren et al. | 348/147 |
| 5,726,670 | * 3/1998 | Tabata et al. | 345/7 |
| 5,751,920 | * 5/1998 | Dalton | 395/109 |

* cited by examiner

*Primary Examiner*—Bipin Shalwala
*Assistant Examiner*—Mansour M. Said

(57) ABSTRACT

In a signal processing circuit used for displaying an image on a two-dimensional display element, an inverse-distorted image creator is provided which previously distorts the image to be displayed on the two dimensional display element so as to have a characteristic inverse to the distortion generated in the eyepiece optical system. The inverse-distortion correction is made for each of the image signals of the three primary colors R, G and B.

28 Claims, 5 Drawing Sheets

BEFORE CORRECTION

AFTER CORRECTION

CORRECTED PROJECTED IMAGE

EYEPIECE IMAGE DISPLAY APPARATUS

BACKGROUND OF THE INVENTION

1. Field of the Invention

The present invention relates to an improvement in the display characteristic of an eyepiece image display apparatus which can be held at a user's head or face.

2. Description of the Related Art

In recent years, for the purpose of "virtual reality" or personally enjoying a large-screen image, visual display apparatuses of a helmet type or goggle type which are held at a user's head or face have been developed. For example, one of them enlarges an image on a small display element such as a liquid display element, an EL display element, etc., and projects it onto an eyeball through an eyepiece optical system such as a lens. The optical system for such an eyepiece visual display apparatus is shown in FIG. 6.

In FIG. 6, reference numeral 1a, 1b denotes a two-dimensional display element, respectively; 2a, 2b denotes an eyepiece lens for enlarging and projecting it in the air; and 3a, 3b denotes an eyeball of an observer 3. In a conventional device, the enlarged virtual image of an original image formed on the two-dimensional display device 1a, 1b is formed by the eyepiece lens 2a, 2b and seen as an enlarged virtual image by the eyeball 3a, 3b.

For a head/face fitting visual display apparatus, assuring a large view angle is required to enhance the presence of a screen. It is not too much to say that the presence is critically dependent on the view angle provided. Realization of an eyepiece optical system permitting the image display over a wide angle is required to give the presence of a three-dimensional effect, intensity, immersing sense, etc. to an observer.

Where an enlarged virtual image is formed by the two dimensional display device arranged in the neighborhood of a refractive optical system having positive power or a reflective optical system/reflective-refractive composite optical system which is used as an eyepiece optical system, optical designing is made so as to arrange an incident pupil (aperture stop) at the position of an eyeball of an observer to correct several kinds of aberrations. Where such a wide-angle enlarged optical system is designed, since the aperture stop is located before the optical system, positive distortion aberration is generated inevitably in the enlarged virtual image formed by the optical system.

FIG. 7 is a graph showing the result of computation of the distortion aberration when an enlarged virtual image is formed at a position of 3 m in front of an eyeball using an eyepiece lens according to the tenth embodiment in Japanese Patent Application No. Hei 9-54970 hereby incorporated by reference. In this graph, it is assumed that a two-dimensional display element has an effective display area of (horizontal 26.88 mm×vertical 20.16 mm, diagonal 33.6 mm), and the center of the two dimensional display element is located at that of an optical axis. In this example, it can be seen from FIG. 7 that a large distortion aberration of 55% is produced at a diagonal end.

FIG. 8 is a view showing the simulation result of a display image based on a positive distortion aberration. Ip denotes the display state of grid lines which divide an effective display area having an aspect ratio of 4:3 into 8×6 square regions. Fp denotes the contour of the region of the effective display image when there is no distortion. It can be understood how appreciation of a natural wide angle image is obstructed because an enlarged distorted image of a spool shape is displayed.

FIG. 9 is a graph showing a magnification color aberration in a state where a virtual image has been formed in the same eyepiece lens system described above. This illustrates the computation result of long wavelength light (610 nm : red) and short wavelength light (470 nm : blue). It can be seen from the figure that large color aberration (red is smaller than blue) exceeding 30 mm is generated at a diagonal end so that where an original image is constituted by an arrangement of three primary colors of red, blue and green, deterioration of the resolution of the display image due to the shear of three primary color image as well as spool-shaped distortion occurs.

The present invention has been accomplished in order to solve the above problem. The first problem is to provide an eyepiece image display apparatus for enlarging/displaying an image formed on a two-dimensional display element, which can correct the distortion in an eyepiece optical system by electrically creating an inverse-distorted image.

The second object of the present invention is to provide an eyepiece image display apparatus which can correct magnification color aberration as well as distortion aberration in an eyepiece optical system.

In order to solve the above problems, the eyepiece image display apparatus comprises a two-dimensional display element; a signal processing circuit for processing an image signal to be displayed on the two-dimensional display element; an eyepiece optical system for enlarging and projecting the image displayed on the two-dimensional display element as a virtual image on a human's eyeball, where the signal processing circuit includes an inverse-distorted image creating means for creating an inverse-distorted image attenuating distortion aberration in the eyepiece optical system on the two-dimensional display element.

The inverse-distorted image created by the inverse-distorted image creating means is a barrel-shaped distorted image displayed on a smaller region than the display region of the two-dimensional display element.

The inverse-distorted image created by the inverse-distorted image creating means is a barrel-shaped distorted image which has a size in a horizontal direction which is equal to that of the display region in the horizontal direction of the two-dimensional display element.

The inverse-distorted image created by the inverse-distorted image creating means is a barrel-shaped distorted image which has a size in a vertical direction which is equal to that of the display region in the vertical direction of the two-dimensional display element.

The inverse-distorted image created by the inverse-distorted image creating means is a barrel-shaped distorted image which has a size in a diagonal direction which is equal to that of the display region in the diagonal direction of the two-dimensional display element.

The image displayed on the two-dimensional display element is composed of three primary components of red, green and blue, and the inverse-distorted image created by the inverse-distorted image creating means is subjected to inverse-distortion correction for each of the three primary colors so that magnification color aberration of the eyepiece optical system is also attenuated.

The two-dimensional display element, eyepiece optical system and signal processing circuit are provided in duality, respectively so as to correspond to left and right eyeballs of an observer.

The inverse-distorted image creating means serves to display a black image in a portion outside the inverse-distorted image and within the effective display-region frame of the two-dimensional display element.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
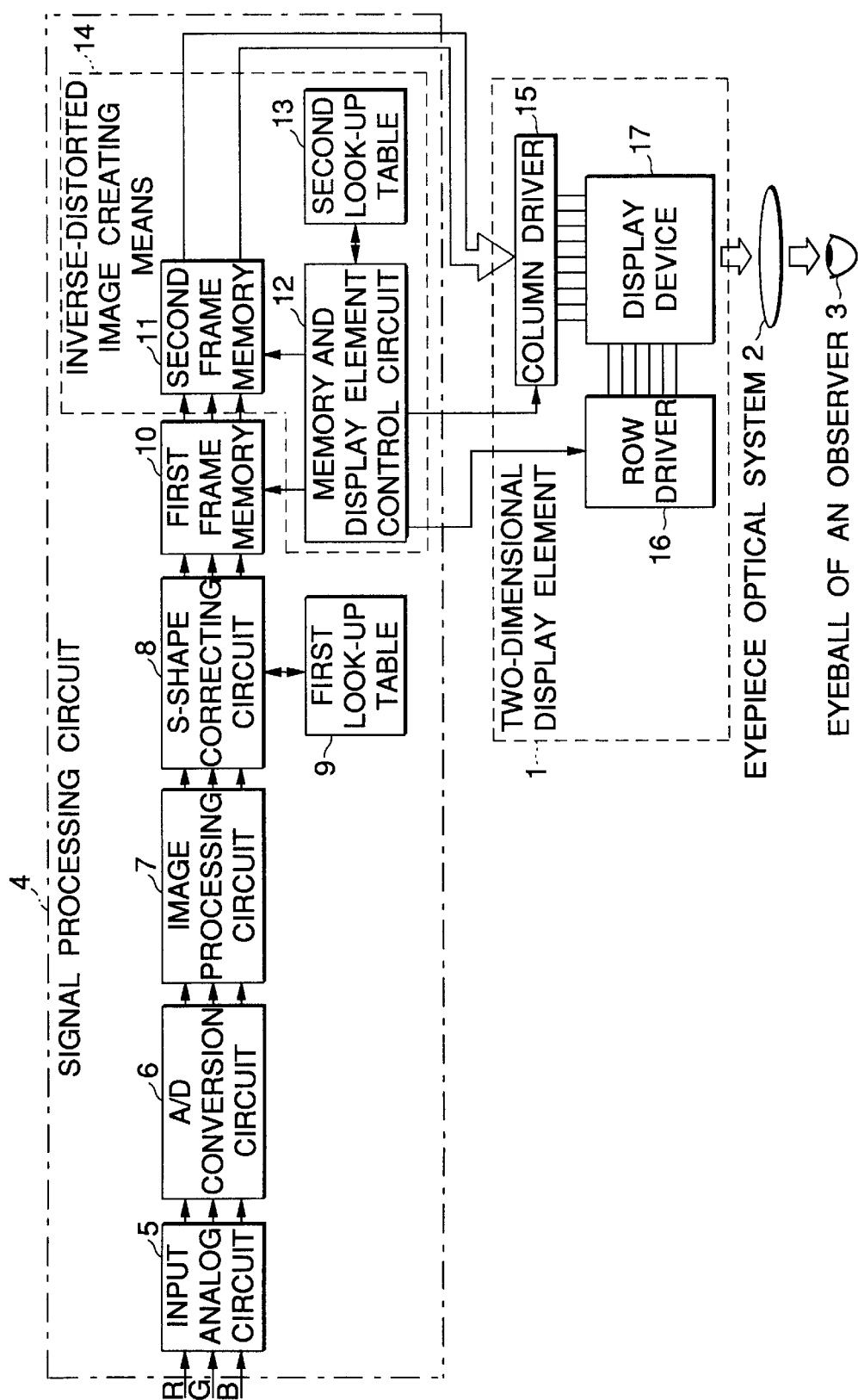
FIG. 1 is a block diagram showing the arrangement of an eyepiece image display apparatus according to the first embodiment of the present invention.

In a eyepiece image display apparatus according to an embodiment of the present invention, the inverse-distorted image creating means creates, on the two-dimensional display element, the distorted image having a characteristic inverse to the distortion aberration of the eyepiece optical system so that the distortion of the enlarged projected image by the eyepiece optical system can be attenuated.

Because the inverse-distorted image creating means crates a barrel-shaped distorted image which is smaller than that of a display area of the two-dimensional display element, the entire original image itself can be corrected.

Because the inverse-distorted image creating means creates a barrel-shaped distorted image which has a size in a horizontal direction which is equal to that of the display region in the horizontal direction of the two-dimensional display element, the aberration generated by an enlarged eyepiece optical system generally having positive power can be attenuated, and the pixels in a horizontal direction of the two-dimensional display element can be used to the maximum.

Because the inverse-distorted image creating means creates a barrel-shaped distorted image which has a size in a vertical direction which is equal to that of the display region in the vertical direction of the two-dimensional display element, the aberration generated by an enlarged eyepiece optical system generally having positive power can be attenuated, and the pixels in the vertical direction of the two-dimensional display element can be used to the maximum.

Because the inverse-distorted image creating means creates a barrel-shaped distorted image which has a size in a diagonal direction which is equal to that of the display region in the diagonal direction of the two-dimensional display element, the aberration generated by an enlarged eyepiece optical system generally having positive power can be attenuated, and the pixels in the horizontal and vertical directions as well as the diagonal direction of the two-dimensional display element can be used to the maximum.

Because the inverse-distorted image creating means makes the inverse-distortion correction for each of three primary colors of an original image, the magnification color aberration as well as the distortion aberration of the eyepiece optical'system can be corrected.

Because the two-dimensional display element, eyepiece optical system and signal processing circuit are provided in duality, respectively so as to correspond to left and right eyeballs of an observer, an eyepiece image display apparatus can be realized which corresponds to both images and permits the stereoscopic display to both eyeballs parallax images.

Since the inverse-distorted image creating means serves to display a black image in a portion outside the inverse-distorted image and within the effective display region frame of the two-dimensional display element, an eyepiece image display apparatus can be realized which displays in black a portion outside the inverse-distorted image and provides a natural enlarged projected image with an unattractive portion of the display device other than the region corresponding to the input image signal component.

DESCRIPTION OF THE PREFERRED EMBODIMENTS

Now referring to the drawings, a detailed explanation will be given below by way of preferred embodiments of the present invention with reference to the accompanying drawings.

Embodiment 1

FIG. 1 is a block diagram showing an eyepiece image display apparatus according to the first embodiment of the present invention.

In the figure, reference numeral 4 denotes a signal processing circuit which includes circuit blocks 5 to 14. Reference numeral 5 denotes an input analog circuit; 6 an A/D conversion circuit; 7 an image processing circuit; 8 an S-shape correcting circuit; 9 a first look-up table (LUT); 10 a first frame memory; 11 a second frame memory; 12 a memory and display element control circuit (hereinafter referred to as "control circuit"); 13 a second look-up table; 14 an inverse-distorted image creating means composed of the above circuits 11, 12 and 13; 15 a column driver of the two-dimensional display element; 16 a row driver of the two-dimensional display element; 17 a display device for the two-dimensional display element 1, e.g. an LCD (Liquid Crystal Display), ELD (Electroluminescent Display), FED (Field Emission Display), LED, etc. Reference numeral 2 denotes an eyepiece optical system, and 3 denotes an eyeball of an observer.

An explanation will be given of the operation of the first embodiment. An image signal, which is a primary color image signal of R, G and B, is supplied to the signal processing circuit 4. In the input analog circuit 5, as previous processing for A/D conversion, gain adjustment and D. C. clamping are made so as to fall within an input range of the A/D converter circuit 6. In the A/D converter circuit 6, an analog image signal is converted into a digital image signal at a predetermined sampling rate. In the image processing circuit 7, edge enhancement, gain adjustment and black level adjustment are made. In the S-shape correcting circuit 8, linearity of the display characteristic is realized by multiplying the non-linear driving characteristic of the display device 17 by a characteristic inverse thereto. Such an inverse characteristic can be available referring to the data relative to the input/output stored in the first look-up table 9. Incidentally, where the display device 17 is driven in an analog manner, S-shape correction for the display characteristic is desired, but where it is driven by a known PWM (pulse width modulation), the S-shape correction circuit 8 and first look-up table 9 may be omitted.

The data corresponding to a single screen of the digital image signal is stored in the first frame memory 10 and further supplied to the inverse-distorted image creating means 14. The inverse-distorted image creating means 14 includes a second frame memory 11, control circuit 12 and second look-up table 13. The look-up table 13 stores coordinate conversion data for correcting the distortion aberration of the eyepiece optical system as described later in detail. The original image data read from the first frame memory 10 under a direction from the control circuit 12 is corrected in its displaying coordinate position on a screen in accordance with the correction information on the second look-up table 13, and stored in the second frame memory 11.

The inverse-distorted image data stored in the second frame memory 11 is supplied to a column driver 15 under a direction from the control circuit 12. Simultaneously, the column driver 15 and the row driver 16 are controlled by the control circuit 12. Thus, the image information is displayed on the display device 17. Incidentally, it should be noted that the signal processing circuit 4 is also a synchronizing signal circuit for synchronizing the circuit blocks. But since this is a known technique, the illustration/explanation thereof will be omitted here.

Figure 2A:
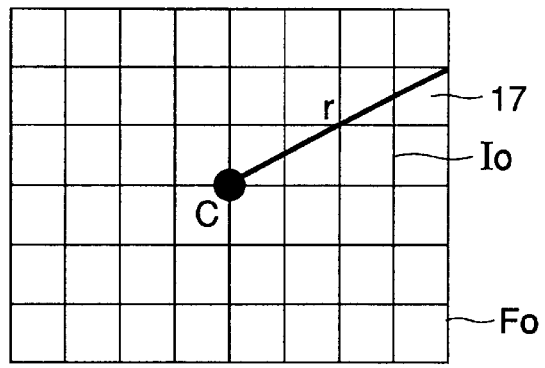
FIGS. 2A to 2C are views for explaining an inverse-distorted image on a display device according to the first embodiment of the present invention and the display image enlarged and projected by an eyepiece optical system.
Figure 2B:
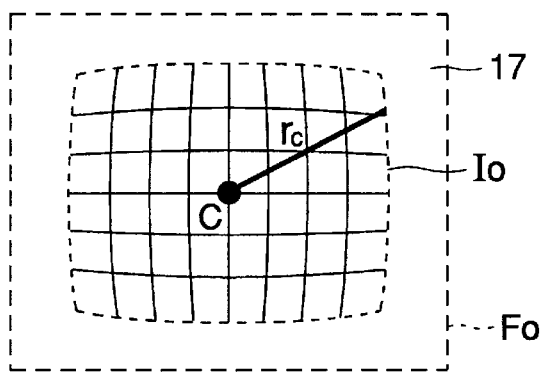
Figure 2C:
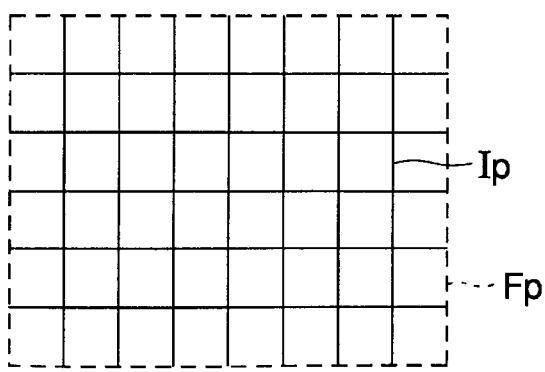

Referring to FIGS. 2A to 2C, a detailed explanation will be given of the inverse-distorted image which is created by the inverse-distorted image creating means 14.

Figure 8:
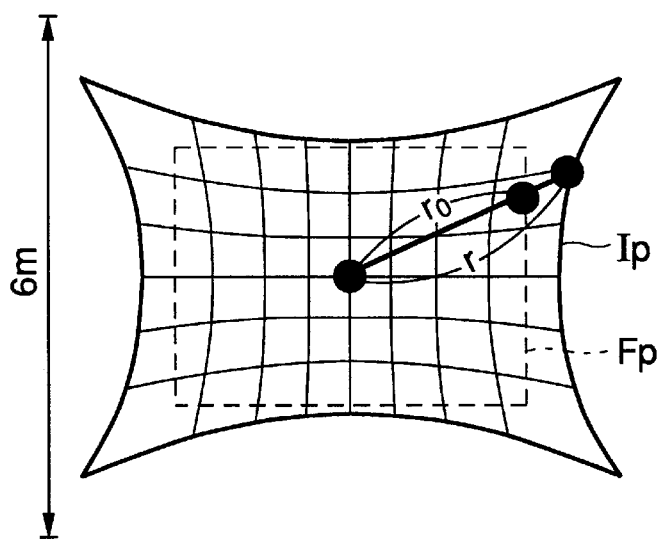
FIG. 8 is a view showing a display image in the conventional eyepiece image display apparatus.
Figure 9:
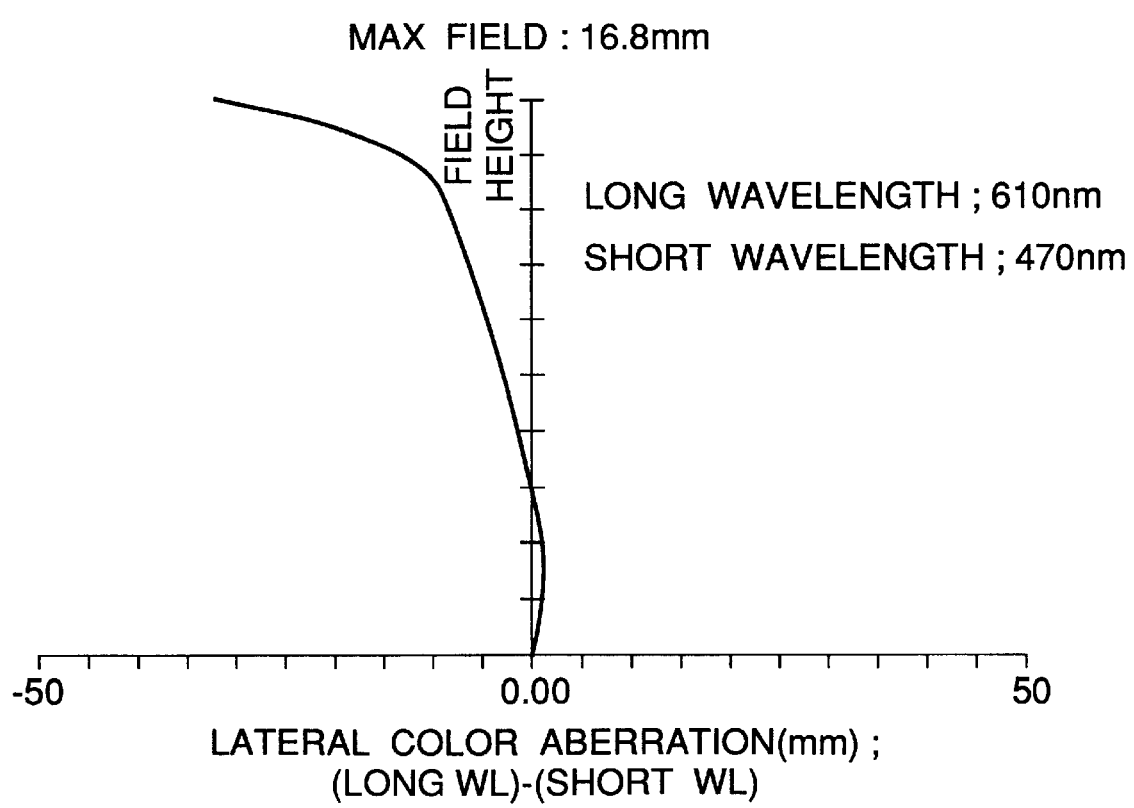
FIG. 9 is a graph showing a typical magnification color aberration of the eyepiece optical system in the conventional eyepiece image display apparatus.

FIG. 2A shows an image before distortion correction which is displayed on the display device 17 and is a mesh image Io consisting of 8×6 squares completely filled within a frame (rim of an effective display region) Fo of the display device 17. As described in connection with the related art, the display image Io, when it is enlarged and projected by an eyepiece optical system having positive distortion aberration, is displayed as an image Ip distorted in a spool shape as shown in FIG. 8. As a result of in-depth observation of the image shown in FIG. 8, it can be seen that the shear of the three primary color images consisting of R, G and B has occurred owing to the magnification color aberration in the eyepiece optical system to deteriorate the resolution.

In FIG. 8, assuming that the distance to a relative reference position (imaging position with no distortion) of a chief light ray which may reach the position of the relative display distance r from the image center of a projected image is r0, distortion aberration D [%] can be given by Equation (1):

$$D = \{(r-r0)/r0\} \times 100 \tag{1}$$

It should be noted that the distortion aberration of Equation (1) is computed representatively for the wavelength (e.g. 546 nm) of the image of green. By transforming Equation (1), the relation between the distance r0 to the relative reference position and the distance r to the relative display position (the actual display position) can be given by Equation (2):

$$r = (1+D/100) \cdot r0 \tag{2}$$

Therefore, by substituting rc for the relative display distance r in Equation (3), the distortion of the image due to the distortion aberration in Equation (1) can be corrected.

$$rc = r/(1+D/100) \tag{3}$$

The correction by Equation (3) means that where the original projected image contains the spool-shaped distortion due to positive distortion aberration (D>0), the inverse-distorted image on the display device 17 creates the barrel-shaped distortion due to the negative distortion aberration.

Figure 7:
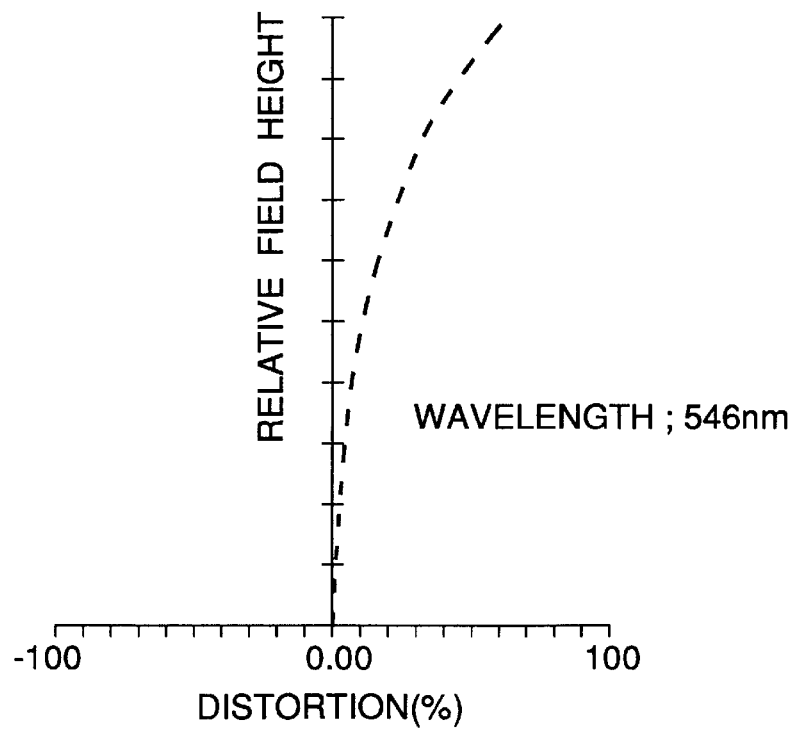
FIG. 7 is a graph showing an exemplary distortion aberration of the eyepiece in the conventional image display apparatus.

FIG. 2B is a view showing the inverse correction for the distortion aberration in FIG. 7. In FIG. 2B, Ic denotes a barrel-shaped image displayed on the display device 17 when the original image Io is subjected to the inverse-distortion correction. Reference symbol C denotes the center of the screen, and rc denotes a relative distance to a predetermined point of an image from the screen center. The magnitude of rc is made smaller than the relative distance r before correction in accordance with Equation (3), and so does not reach the effective display region frame Fo of the display device.

FIG. 2C is a view showing the image displayed when the inverse-distorted image of FIG. 2B is enlarged/projected by an eyepiece optical system. It can be seen that the display image Ip is subjected to the positive distortion by the eyepiece optical system. In the signal processing circuit 4, the information for coordinate conversion into the inverse-distorted image according to Equation (3) is stored in the second look-up table 13. The information is stored in the form of polynomial approximation, polygonal line approximation, linear approximation, etc. The manner of approximation, order of approximation and number of polygonals may be selected in accordance with a prescribed distortion correction accuracy as necessity requires.

Embodiment 2

The inverse-distortion correction according to Equation (3) improves the correction accuracy. This realizes the distortion aberration correction in the eyepiece optical system within a limit of the pixel density of the two dimensional display element. However, as shown in FIG. 2B, the display image becomes smaller than the effective display frame Fo of the display device 17 so that the rate of sacrificing the resolution of the display image is large. Therefore, assuming that the distortion aberration corresponding to the effective end in the horizontal direction of the display device in the eyepiece optical system is Dh (%), the relative display distance r is distortion-converted into rc as Equation (4). Thus, the display pixels in the horizontal direction of the display device 17 can be used to the maximum limit, and the angle of view can be extended as compared with the first embodiment.

$$rc = \{(1+Dh/100)/(1+D/100)\} \cdot r \tag{4}$$

Figure 3:
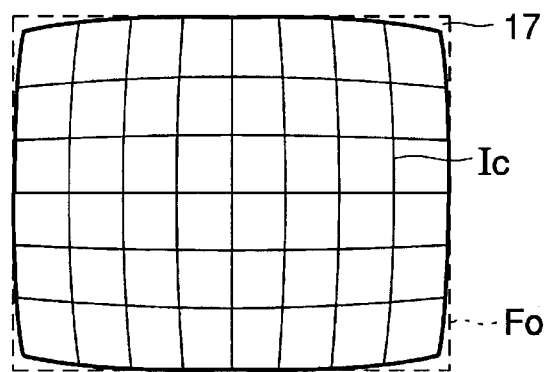
FIG. 3 is an inverse-distorted image on a display device according to the second embodiment of the present invention.

The inverse-distorted image according to Equation (4) is shown in FIG. 3.

It can be seen from FIG. 3 that the barrel-shaped image has been extended to the periphery of the effective display region in the horizontal direction of the display device 17. In this case, the distortion correction effect is not greater than the case of the first embodiment. However, shaping the image on the display device 17 into a barrel can attenuate the sense of distortion of the projected image and maximizes the display angle of view in the horizontal direction. In the signal processing circuit 4, the information for coordinate conversion into the inverse-distorted image according to Equation (4) is stored in the second look-up table 13. The information is stored in the form of polynomial approximation, polygonal line approximation, linear approximation of Equation (4), etc. The manner of approximation, order of approximation and number of polygonals may be selected in accordance with a prescribed distortion correction accuracy as necessity requires.

Embodiment 3

Assuming that the distortion aberration corresponding to the effective end in the vertical direction of the display device in the eyepiece optical system is Dv (%), the relative display distance r is distortion-converted into rc according to Equation (5). Thus, the display pixels in the vertical direction of the display device 17 can be used to the maximum limit, and the angle of view can be extended as compared with the first embodiment.

$$rc=\{(1+Dv/100)/(1+D/100)\}\cdot r \qquad (5)$$

Figure 4:
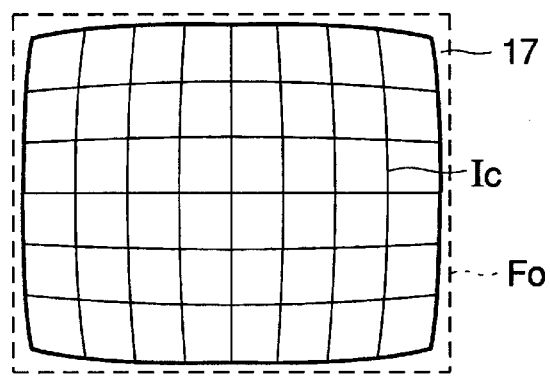
FIG. 4 is an inverse-distorted image on a display device according to the third embodiment of the present invention.

The inverse-distorted image according to Equation (5) is shown in FIG. 4.

It can be seen from FIG. 4 that the barrel-shaped image has been extended to the periphery of the effective display region in the vertical direction of the display device 17. In this case, the distortion correction effect is not greater than the case of the first embodiment. However, shaping the image on the display device 17 into a barrel can attenuate the sense of distortion of the projected image and maximizes the angle of view in the vertical direction. In the signal processing circuit 4, the information for coordinate conversion into the inverse-distorted image according to Equation (5) is stored in the second look-up table 13. The information is stored in the form of polynomial approximation, polygonal line approximation, linear approximation of Equation (5), etc. The manner of approximation, order of approximation and number of polygonals may be selected in accordance with a prescribed distortion correction accuracy as necessity requires.

Embodiment 4

Assuming that the distortion aberration corresponding to the effective end in the diagonal direction of the display device in the eyepiece optical system is Dd (%), the relative display distance r is distortion-converted into rc as Equation (6). Thus, the display pixels in the diagonal direction of the display device 17 can be used to the maximum limit, and the angle of view can be extended as compared with the first embodiment.

$$rc=\{(1+Dd/100)/(1+D/100)\}\cdot r \qquad (6)$$

Figure 5:
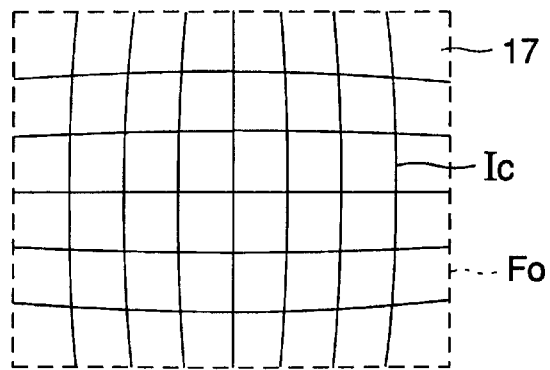
FIG. 5 is an inverse-distorted image on a display device according to the fourth embodiment of the present invention.
Figure 6:
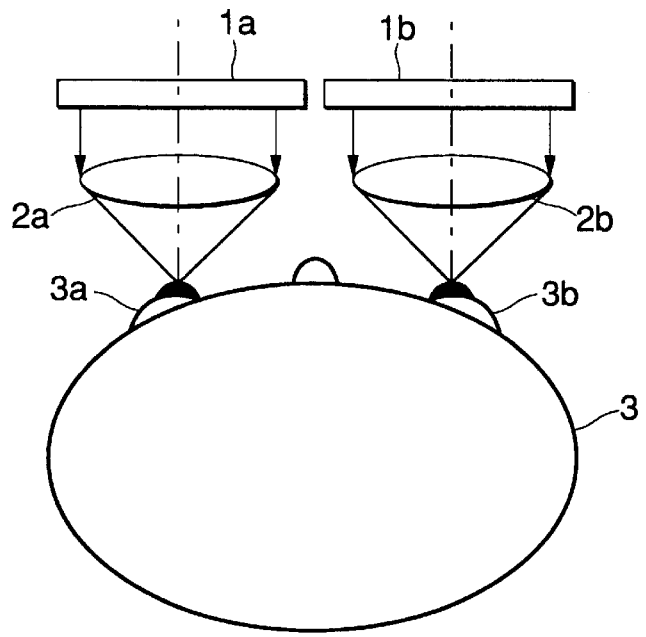
FIG. 6 is an arrangement view of the eyepiece optical system in a conventional eyepiece image display apparatus.

The inverse-distorted image according to Equation (6) is shown in FIG. 5.

It can be seen from FIG. 5 that the barrel-shaped image has been extended to the periphery of the effective display region in the diagonal direction of the display device 17. In this case, the distortion correction effect is not greater than the case of the first embodiment. However, shaping the image on the display device 17 into a barrel can attenuate the sense of distortion of the projected image and maximizes the angle of view in the diagonal direction. In the signal processing circuit 4, the information for coordinate conversion into the inverse-distorted image according to Equation (6) is stored in the second look-up table 13. The information is stored in the form of polynomial approximation, polygonal line approximation, linear approximation of Equation (6), etc. The manner of approximation, order of approximation and number of polygonals may be selected in accordance with a prescribed distortion correction accuracy as necessity requires.

Embodiment 5

In the first to fourth embodiments, the inverse-distortion correction of the display image was made typically in terms of the distortion aberration for green. However, the distortion correction for each of the primary colors of R, G and B realizes correction for pixel displacement due to the magnification color aberration in the eyepiece optical system as well as the distortion correction. The relative distance from the screen center from the original image for each of the colors R, G and B can be converted into rc by the following equations (7) to (9):

$$R: rc=\{Kr/(1+Dr/100)\}\cdot r \qquad (7)$$

$$G: rc=\{Kg/(1+Dg/100)\}\cdot r \qquad (8)$$

$$B: rc=\{Kb/(1+Db/100)\}\cdot r \qquad (9)$$

where Dr, Dg and Db represent distortion aberrations in the enlarged projected state in the eyepiece optical system at the wavelengths (e.g. 610 nm, 546 nm, 470 nm); Kr, Kg and Kb represent correction coefficients which can be given by the equations, respectively in which n=, g and b in any one of the following equations (10) to (13).

$$Kn=1 \qquad (10)$$

$$Kn=(1+Dhn/100) \qquad (11)$$

$$Kn=(1+Dvn/100) \qquad (12)$$

$$Kn=(1+Ddn/100) \qquad (13)$$

where n=, g, b; and Dhn, Dvn and Ddn represent the distortion aberrations for the primary color n at the effective ends in the horizontal, vertical and diagonal directions of the display device, respectively.

In the signal processing circuit 4 shown in FIG. 1, the information for coordinate conversion into the inverse-distorted image according to the correction equations of any combination of the above Equations (7) to (9) and (10) to (13) is stored in the second look-up table 13. The information is stored in the form of polynomial approximation, polygonal line approximation, linear approximation of the correction equation, etc. The manner of approximation, order of approximation and number of polygonals may be selected in accordance with a prescribed distortion correction accuracy as necessity requires.

The inverse-distortion correction for each primary color based on the combination of Equations (7) to (9) and (10) realizes the correction for the distortion aberration in the eyepiece optical system and magnification color aberration for three primary colors and also improves the approximation accuracy of a correction curve. This leads to the correction to the limit of the pixel density of the display device 17, thereby providing an enlarged projected image at a high resolution with no distortion and color displacement.

The inverse-distortion correction for each primary color based on the combination of Equations (7) to (9) and (11)

permits each primary color image to be displayed-to reach the end in the horizontal direction of the display device 17. This relaxes the distortion aberration in the eyepiece optical system and the magnification color aberration and also realizes the wide angle of view and high definition in the horizontal direction.

The inverse-distortion correction for each primary color based on the combination of Equations (7) to (9) and (12) permits each primary color image to be displayed to reach the end in the vertical direction of the display device 17. This relaxes the distortion aberration in the eyepiece optical system and the magnification color aberration and also realizes the wide angle of view and high definition in vertical direction.

The inverse-distortion correction for each primary color based on the combination of Equations (7) to (9) and (13) permits each primary color image to be displayed to reach the ends in the horizontal, vertical and diagonal directions of the display device 17. This relaxes the distortion aberration in the eyepiece optical system and the magnification color aberration and also realizes the wide angle of view and high definition in diagonal direction and effective use of the pixels of the display device 17.

Referring to FIG. 1, for convenience of explanation, an example having a single number of two-dimensional display element 1, eyepiece optical system 2 and a signal processing circuit 4 was explained.

The configuration shown in FIG. 1, as it is, can realize the apparatus in a single eye-ball eyepiece image display system. However, by displaying the image on the two-dimensional display element 1 divisionally on two eyepiece optical systems corresponding to both eyeballs, such a configuration can be modified into an eyepiece display apparatus corresponding to both eyeballs.

The eyepiece display apparatus may be configured in such a manner that a pair of two-dimensional display elements 1$a$, 1$b$ are connected to the outputs of inverse-distorted image signals from two sets of signal processing circuits 4, and the images from the pair of two-dimensional display elements 1$a$, 1$b$ are enlarged for observation by a pair of eyepiece optical systems 2$a$, 2$b$ corresponding to both left and right eyeballs. In this case, the images to be supplied to the left and right signal processing circuits may be the same monoscopic image or a known parallax image permitting a stereoscopic display.

In this case, the images given to both left and right may be completely superposed on each other. Otherwise, as well known, the left and right images may be offset from each other outwardly in the horizontal direction so that the horizontal angle of view can be extended. For this reason, it is desirable that the display images corresponding to both left and right eyes are shifted outwardly in the left/right direction by the following manners:

(1) shifting the center of the display region of the display device 17 in a horizontal direction with respect to the optical axis of the eyepiece optical system to move the virtual image outwardly in the horizontal direction, and (2) slanting a pair of entire display units each composed of the eyepiece optical system 2 and two-dimensional display element 1 in a horizontal plane, respectively, to shift the position where the virtual image is to be formed, outwardly in appearance.

Also, where the enlarged display images are shifted outwardly in the horizontal direction so that they are superposed on each other, the apparatus according to the present invention, which provides less distortion of the wholly enlarged and projected display images corresponding to both eyeballs, respectively, can provide a wide angle image display corresponding to both eyeballs which is natural in superposition of the left and right projected images, and gives a high sense of realism and less fatigue of eyes.

As shown in FIG. 2B, FIG. 3 and FIG. 4, where the inverse-distorted image Ic does not completely fill up the entire effective display region of the device 17, the distortion image creation means 14 displays in black the portion outside the inverse-distorted image Ic and within the effective display region frame Fo so that the other display device portion than the region corresponding to the input image signal component can not be observed in the enlarged projected image.

The present invention, which is configured as described above, has the following effects.

The inverse-distorted image creation means creates, on the two-dimensional display element, the distorted image having a characteristic inverse to the distortion aberration of the eyepiece optical system so that the distortion of the enlarged projected image by the eyepiece optical system can be attenuated.

Because the inverse-distorted image is a barrel-shaped distorted image, the aberration generated by an enlarged eyepiece optical system having generally positive power can be corrected. Thus, an eyepiece image display device can be realized which can correct the distortion of the entire image by displaying the inverse-distorted image within the area which is smaller than the display region.

Because the inverse-distorted image is a barrel-shaped distorted image, the aberration generated by an enlarged eyepiece optical system having positive power can be attenuated, and the pixels in a horizontal direction of the two-dimensional display element can be used to a maximum.

Because the inverse-distorted image is a barrel-shaped distorted image, the aberration generated by an enlarged eyepiece optical system having positive power can be attenuated, and the pixels in a vertical direction of the two-dimensional display element can be used to a maximum.

Because the inverse-distorted image is a barrel-shaped distorted image, the aberration generated by an enlarged eyepiece optical system having positive power can be attenuated, and the pixels in the horizontal and vertical direction as well as a diagonal direction of the two-dimensional display element can be used to a maximum.

Because the inverse-distortion correction is made for each of the three primary colors of an original image, the if magnification color aberration as well as the distortion aberration of the eyepiece optical system can be corrected. Thus, an eye piece image display device can be realized which can make the image display with high resolution and less distortion and color displacement.

An eyepiece image display device can be realized which corresponds to both images and permits stereoscopic display by dual parallax images.

Since the outside of the inverse-distorted image is displayed in black, an eyepiece image display device can be realized which provides a natural enlarged projected image without an unattractive display device portion other than the region corresponding to the input image signal component.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. An eyepiece image display apparatus, comprising:
   a two-dimensional display element;
   a signal processing circuit for processing an image signal to be displayed on said two-dimensional display element;
   an eyepiece optical system for enlarging and projecting an image displayed on said two-dimensional display element as a virtual image onto an observer's eyeball, wherein
   said signal processing circuit includes an inverse distorted image creator creating an inverse-distorted image attenuating the influence of distortion aberration in said eyepiece optical system on said two-dimensional display element.

2. The eyepiece image display apparatus of claim 1, wherein the inverse-distorted image created by said inverse-distorted image creator is a barrel-shaped distorted image displayed on a smaller region than a display region of said two-dimensional display element.

3. The eyepiece image display apparatus of claim 1, wherein the inverse-distorted image created by said inverse-distorted image creator is a barrel-shaped distorted image which has a size in a horizontal direction that is about equal to that of a display region in a horizontal direction of said two-dimensional display element.

4. The eyepiece image display apparatus of claim 1, wherein the inverse-distorted image created by said inverse-distorted image creator is a barrel-shaped distorted image which has a size in a vertical direction that is about equal to that of a display region in a vertical direction of said two-dimensional display element.

5. The eyepiece image display apparatus of claim 1, wherein the inverse-distorted image created by said inverse-distorted image creator is a barrel-shaped distorted image which has a size in a diagonal direction that is about equal to that of a display region in a diagonal direction of said two-dimensional display element.

6. The eyepiece image display apparatus of claim 1, wherein the image displayed on said two-dimensional display element is composed of three primary color components of red, green and blue, and
   the inverse-distorted image created by said inverse-distorted image creator is subjected to inverse-distortion correction for each of the three primary colors so that the influence of magnification color aberration of said eyepiece optical system is also attenuated.

7. The eyepiece image display apparatus of claim 1, wherein said two-dimensional display element, eyepiece optical system and signal processing circuit are provided in duality, respectively so as to correspond to left and right eyeballs of an observer.

8. The eyepiece image display apparatus of claim 1, wherein said inverse-distorted image creator serves to display a black image in a portion outside the inverse-distorted image and within an effective display region frame of the two-dimensional display element.

9. A virtual reality image display apparatus, comprising:
   at least one display element;
   an image signal processing circuit processing an image signal to be displayed on the at least one display element, wherein said image signal processing circuit includes an inverse distorted image creator converting the image signal to be displayed on the at least one display element into an inverse-distorted image, and said image signal processing circuit causing said inverse-distorted image to be displayed on the at least one display element; and
   an eyepiece optical system enlarging and projecting said inverse-distorted image onto at least one eyeball of an observer.

10. The virtual reality image display apparatus according to claim 9, wherein said inverse-distorted image is subjected to inverse-distortion correction for at least one of three primary colors, wherein color aberration caused by enlarging and projecting said inverse-distorted image is attenuated.

11. The virtual reality image display apparatus according to claim 9, wherein said image signal processing circuit is provided for each one of the at least one display element corresponding to the at least one eyeball of the observer.

12. The virtual reality image display apparatus according to claim 9, wherein said inverse distorted image creator converts the image signal to be displayed on the at least one display element into an inverse-distorted image according to the equation $rc = r/(1+D/100)$, wherein r is a relative distance value of an undistorted object and D is a distortion aberration value.

13. The virtual reality image display apparatus according to claim 9, wherein said inverse distorted image creator converts the image signal to be displayed on the at least one display element into an inverse-distorted image according to the equation $rc = \{(1+Dh/100)/(1+D/100)\} \times r$, so as to maximize a horizontal pixel depth of the at least one display element, wherein Dh corresponds to a distortion aberration of an image signal in a horizontal direction, r is a relative distance value of an undistorted object, and D is a distortion aberration value.

14. The virtual reality image display apparatus according to claim 9, wherein said inverse distorted image creator converts the image signal to be displayed on the at least one display element into an inverse-distorted image according to the equation $rc = \{(1+Dv/100)/(1+D/100)\} \times r$, so as to maximize a vertical pixel depth of the at least one display element, wherein Dv corresponds to a distortion aberration of an image signal in a vertical direction, r is a relative distance value of an undistorted object, and D is a distortion aberration value.

15. The virtual reality image display apparatus according to claim 9, wherein said inverse distorted image creator converts the image signal to be displayed on the at least one display element into an inverse-distorted image according to the equation $rc = \{(1+Dd/100)/(1+D/100)\} \times r$, so as to maximize a diagonal pixel depth of the at least one display element, wherein Dd corresponds to a distortion aberration of an image signal in a diagonal direction, r is a relative distance value of an undistorted object, and D is a distortion aberration value.

16. The virtual reality image display apparatus according to claim 9, wherein said inverse distorted image creator displays a black image in a portion outside said inverse-distorted image and within an effective display region frame of the display element.

17. The virtual reality image display apparatus according to claim 10, wherein said inverse-distorted image is subjected to inverse-distortion correction for a color red in accordance with the equation $rc = \{Kr/(1+Dr/100)\} \times r$, wherein Dr is a red color distortion aberration value at a wavelength of 610 nm, and Kr represents a red color correction coefficient.

18. The virtual reality image display apparatus according to claim 17, wherein Kr is further defined as $Kr=1$, corresponding to an image distortion correction, $Kr=(1+Dhr/$ 100), corresponding to a horizontal image distortion correction, Kr=(1+Dvr/100), corresponding to a vertical image distortion correction, and Kr=(1+Ddr/100), corresponding to a diagonal image distortion correction.

19. The virtual reality image display apparatus according to claim 10, wherein said inverse-distorted image is subjected to inverse-distortion correction for a color green in accordance with the equation rc={Kg/(1+Dg/100)}×r, wherein Dg is a green color distortion aberration value at a wavelength of 546 nm, and Kg represents a green color correction coefficient.

20. The virtual reality image display apparatus according to claim 19, wherein Kg is further defined as Kg=1, corresponding to an image distortion correction, Kg=(1+Dhg/100), corresponding to a horizontal image distortion correction, Kg=(1+Dvg/100), corresponding to a vertical image distortion correction, and Kg=(1+Ddg/100), corresponding to a diagonal image distortion correction.

21. The virtual reality image display apparatus according to claim 10, wherein said inverse-distorted image is subjected to inverse-distortion correction for a color blue in accordance with the equation rc={Kb/(1+Db/100)}×r, wherein Db is a blue color distortion aberration value at a wavelength of 470 nm, and Kb represents a blue color correction coefficient.

22. The virtual reality image display apparatus according to claim 21, wherein Kb is further defined as Kb=1, corresponding to an image distortion correction, Kb=(1+Dhb/100), corresponding to a horizontal image distortion correction, Kb=(1+Dvb/100), corresponding to a vertical image distortion correction, and Kb=(1+Ddb/100), corresponding to a diagonal image distortion correction.

23. A method of attenuating a distortion aberration occurring in a virtual reality display device, comprising the steps of:

converting an image signal to be displayed on at least one display element into an inverse-distorted image;

causing said inverse-distorted image to be displayed on the at least one display element; and enlarging and projecting said displayed inverse-distorted image onto at least one eyeball of an observer.

24. The method of attenuating a distortion aberration according to claim 23, further comprising the step of displaying a black image in a portion outside said inverse-distorted image and within an effective display region frame of the display element.

25. An inverse-distorted image creating circuit, comprising:

a first image frame memory;

a second image frame memory;

a look-up storage, wherein the look-up storage stores image coordinate conversion data to be used for correcting a distortion aberration caused by enlarging and projecting an image stored in the first image frame memory; and a control circuit, wherein said control circuit causes the stored image coordinate conversion data to be read from the look-up storage for creating said inverse-distorted image, and storing said inverse-distorted image in the second image frame memory.

26. The inverse-distorted image creating circuit according to claim 25, wherein said inverse-distorted image is read from the second image frame memory by a display element, is displayed by the display element, and is enlarged and projected by an eyepiece optical system.

27. The inverse-distorted image creating circuit according to claim 26, wherein the enlarged and projected inverse-distorted image is projected to at least one eyeball of an observer so as to form a virtual reality image having an attenuated distortion aberration.

28. The inverse-distorted image creating circuit according to claim 25, wherein said inverse-distorted image creating circuit displays a black image in a portion outside said inverse-distorted image and within an effective display region frame of the display element.

* * * * *